US011750921B2

(12) United States Patent
Hanayama et al.

(10) Patent No.: US 11,750,921 B2
(45) Date of Patent: Sep. 5, 2023

(54) IMAGE PICKUP APPARATUS CAPABLE OF PERFORMING FUNCTION CHANGE, AND CONTROL METHOD FOR IMAGE PICKUP APPARATUS

(71) Applicant: CANON KABUSHIKI KAISHA, Tokyo (JP)

(72) Inventors: Tatsuya Hanayama, Tokyo (JP); Masayoshi Shibata, Kanagawa (JP); Yusuke Toriumi, Tokyo (JP); Takuya Sakamaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/667,219

(22) Filed: Feb. 8, 2022

(65) Prior Publication Data
US 2022/0263999 A1     Aug. 18, 2022

(30) Foreign Application Priority Data

Feb. 17, 2021   (JP) .................. 2021-023507

(51) Int. Cl.
*H04N 23/663*     (2023.01)
*G06K 7/10*       (2006.01)
(Continued)

(52) U.S. Cl.
CPC ....... *H04N 23/663* (2023.01); *G06K 7/10366* (2013.01); *H04M 1/0264* (2013.01);
(Continued)

(58) Field of Classification Search
CPC ............. H04N 5/23209; H04N 5/2253; H04N 5/23245; G06K 7/10366; G06K 17/00;
(Continued)

(56) References Cited

U.S. PATENT DOCUMENTS 9,729,685 B2 *  8/2017  Ive .................. H04M 1/7246
2004/0203502 A1 * 10/2004  Dietrich ............... G06F 1/1677
455/90.3
(Continued)

FOREIGN PATENT DOCUMENTS

JP     2006-246130 A    9/2006
JP     2017-045043 A    3/2017

*Primary Examiner* — Padma Haliyur
(74) *Attorney, Agent, or Firm* — Cowan, Liebowitz & Latman, P.C.

(57) ABSTRACT

An image pickup apparatus whose function can be easily changed is provided. The image pickup apparatus, to which a mounting component part having a wireless IC tag can be attached, comprising at least one processor and/or circuit configured to function as following units, a reading unit configured to read information recorded in the wireless IC tag, an attitude determination unit configured to determine an attitude of the mounting component part, which is attached, with respect to the image pickup apparatus, and a function changing unit configured to change a function of the image pickup apparatus. In a case that the reading unit can read the information recorded in the wireless IC tag, the function changing unit changes the function of the image pickup apparatus according to the attitude of the mounting component part, which is determined.

20 Claims, 15 Drawing Sheets

(51) Int. Cl.
  *H04M 1/02* (2006.01)
  *H04N 23/54* (2023.01)
  *H04N 23/667* (2023.01)
(52) U.S. Cl.
  CPC .......... *H04N 23/54* (2023.01); *H04N 23/667* (2023.01); *H04M 2250/04* (2013.01); *H04M 2250/12* (2013.01); *H04M 2250/52* (2013.01)
(58) Field of Classification Search
  CPC .......... H04M 1/0264; H04M 2250/04; H04M 2250/12; H04M 2250/52
  See application file for complete search history.

(56) References Cited

U.S. PATENT DOCUMENTS

| | | | |
|---|---|---|---|
| 2006/0291842 A1* | 12/2006 | Tokiwa | G03B 17/565 |
| | | | 348/E5.047 |
| 2017/0031235 A1* | 2/2017 | Kubotera | G03B 17/04 |
| 2018/0278915 A1* | 9/2018 | Ogawa | H04N 5/23229 |
| 2019/0098190 A1* | 3/2019 | Hosoe | G06F 1/1632 |

\* cited by examiner

| FUNCTION | CHARGING INFORMATION |
|---|---|
| SELFIE MODE | EXISTENCE |
| NIGHT VIEW MODE | NONEXISTENCE |
| SPORT MODE | EXISTENCE |
| ⋮ | |

IMAGE PICKUP APPARATUS CAPABLE OF PERFORMING FUNCTION CHANGE, AND CONTROL METHOD FOR IMAGE PICKUP APPARATUS

BACKGROUND OF THE INVENTION

Field of the Invention

The present invention relates to an image pickup apparatus capable of performing a function change, and a control method for the image pickup apparatus.

Description of the Related Art

In recent years, an outdoor camera has been known that can be easily worn by a user by equipping a camera main body with a carabiner so that it can be easily used in an outdoor scene and the like. Since such an outdoor camera places importance on miniaturization and durability, the outdoor camera does not have an LCD (Liquid Crystal Display) screen, and further the number of buttons and levers on the camera main body is reduced. As a result, the function change of the outdoor camera is instructed not by the button or lever of the camera main body but by an external device such as a wirelessly connected smartphone.

On the other hand, in the outdoor scene, since the user want to avoid submersion or loss of the smartphone, in some cases, the user does not carry the smartphone with him/her. In this case, it is difficult to perform the function change of the outdoor camera.

Therefore, a technique, which performs a function change of a camera by connecting an interchangeable lens as an external device to an image pickup apparatus, has been proposed (see, for example, Japanese Laid-Open Patent Publication (kokai) No. 2006-246130). In this technique, the interchangeable lens has an IC (Integrated Circuit) tag, and the image pickup apparatus has an IC tag reader. For example, shading correction information is recorded in the IC tag of the interchangeable lens, and when the interchangeable lens is attached to the image pickup apparatus, the image pickup apparatus reads the shading correction information by means of the IC tag reader and then performs a shading correction processing based on the shading correction information.

Further, an accessory that imparts a new function to a smartphone by attaching it to the smartphone is also known (see, for example, Japanese Laid-Open Patent Publication (kokai) No. 2017-45043).

However, since each technique changes the function depending on whether or not the interchangeable lens or the accessory is attached to the image pickup apparatus or the smartphone, in order to change the function, it is necessary to detach the interchangeable lens or the accessory from the image pickup apparatus or the smartphone. In this case, since it is necessary to hold the detached interchangeable lens or the detached accessory separately from the image pickup apparatus (the camera) or the smartphone, there is a risk that they may be lost, and the function of the image pickup apparatus or the smartphone cannot be easily changed.

SUMMARY OF THE INVENTION

The present invention provides an image pickup apparatus whose function can be easily changed, and a control method for the image pickup apparatus.

Accordingly, the present invention provides an image pickup apparatus, to which a mounting component part having a wireless IC tag can be attached, comprising at least one processor and/or circuit configured to function as following units, a reading unit configured to read information recorded in the wireless IC tag, an attitude determination unit configured to determine an attitude of the mounting component part, which is attached, with respect to the image pickup apparatus, and a function changing unit configured to change a function of the image pickup apparatus, and wherein in a case that the reading unit can read the information recorded in the wireless IC tag, the function changing unit changes the function of the image pickup apparatus according to the attitude of the mounting component part, which is determined.

According to the present invention, it is possible to easily change the function of the image pickup apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
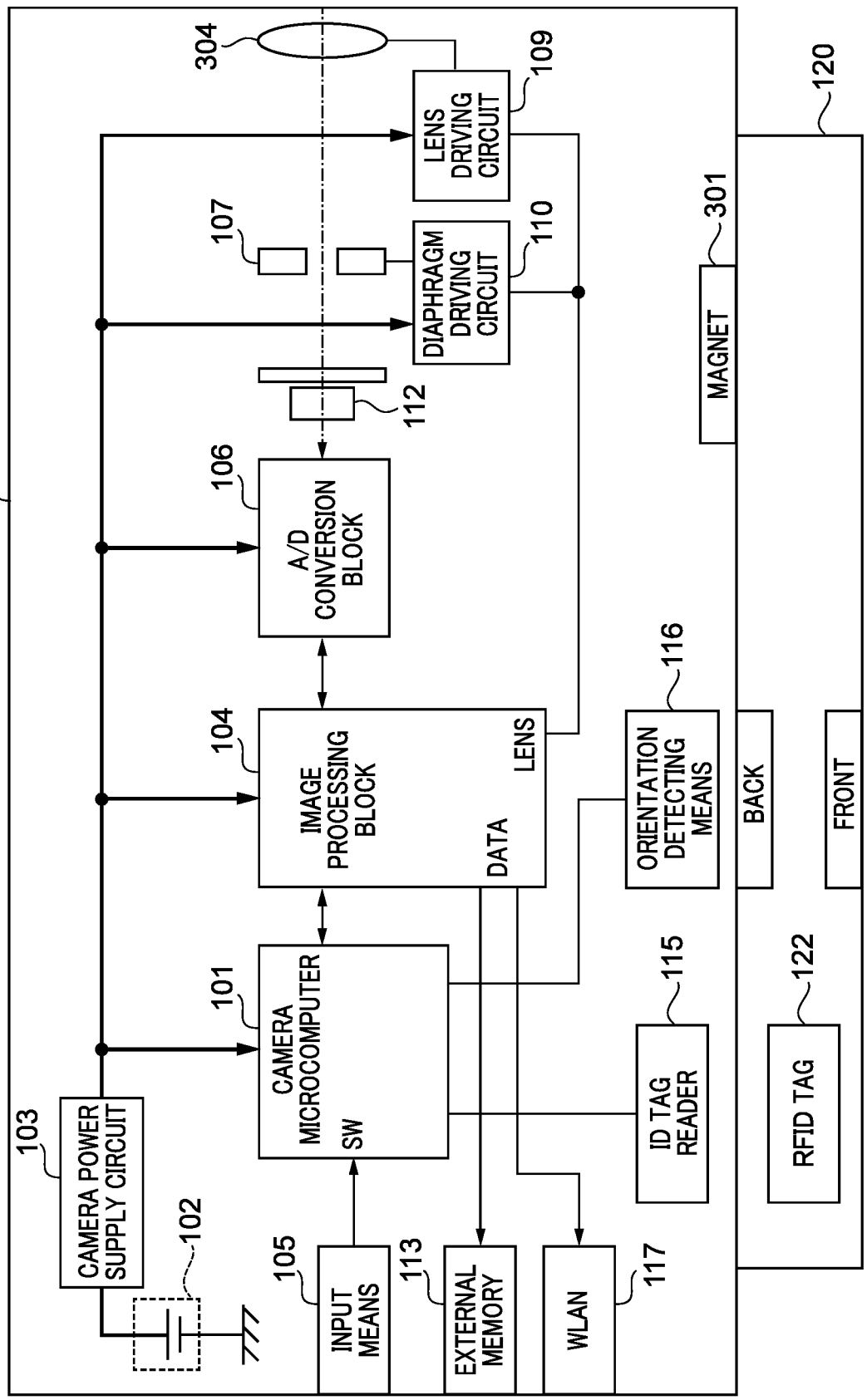
FIG. 1 is a block diagram that schematically shows a configuration of a camera as an image pickup apparatus according to a first embodiment of the present invention and a mounting component part that can be attached to the camera.

At first, a first embodiment of the present invention will be described. FIG. 1 is a block diagram that schematically shows a configuration of a camera as an image pickup apparatus according to the first embodiment of the present invention and a mounting component part that can be attached to the camera. As shown in FIG. 1, a substantially flat plate-shaped mounting component part 120 can be attached to a camera 100, which is a digital camera. The camera 100 and the mounting component part 120 constitute an image pickup system.

The camera 100 includes a camera microcomputer 101 (a function changing unit), a battery 102, a camera power supply circuit 103, an image processing block 104, an input means 105 such as a release button 305, an A/D conversion block 106, a shutter 107, and an image pickup lens 304. Further, the camera 100 includes a lens driving circuit 109, a diaphragm driving circuit 110, an image pickup element 112, a magnet 301, an ID (identification) tag reader 115 (a reading unit), an orientation detecting means 116 (an attitude determination unit), and a WLAN (Wireless Local Area Network) 117. Furthermore, an external memory 113 is attached to the camera 100. The mounting component part 120 includes an RFID (Radio Frequency Identification) tag 122 (a wireless IC tag), and is attracted to the camera 100 by a magnetic force of the magnet 301. Moreover, the mounting component part 120 may be configured to be capable of being attached to a camera other than the camera 100.

A smartphone (not shown) and the camera 100 are connected by the WLAN 117. As a result, a user can use the smartphone to set a function of the camera 100, display a photographed image, transfer an image file, and receive specific information of the mounting component part 120 recorded in the RFID tag 122. In particular, the specific information recorded in the RFID tag 122 is downloaded from a server on the Internet via the smartphone, and then is recorded in the RFID tag 122 in response to an operation of the smartphone by the user. There are various types of the substantially flat plate-shaped mounting component parts 120, for example, those having a mirror-finished back surface and those a specific animation character (a specific cartoon character) is printed on the back surface. Such information is also recorded in the RFID tag 122 as the specific information of the mounting component part 120.

The camera microcomputer 101 is a microcomputer that controls each part of the camera 100. When the battery 102 is attached to the camera 100, power is supplied from the camera power supply circuit 103 to the camera microcomputer 101, and when a power switch (not shown) is turned on, the power is supplied to each configuration component of the camera 100 under the control of the camera microcomputer 101. The camera microcomputer 101 communicates with the RFID tag 122 of the mounting component part 120 via wireless communications, and obtains the specific information of the mounting component part 120. Further, by using the orientation detecting means 116 (a mounting orientation detecting means), the camera microcomputer 101 can detect that the mounting component part 120 is attached to the camera 100 in which orientation (direction).

Moreover, a method of detecting the orientation of the mounting component part 120, which is attached to the camera 100, will be described later. The shutter 107 controls an exposure time of the image pickup element 112 under the control of the camera microcomputer 101. The image pickup element 112 performs a photoelectric conversion with respect to a subject image formed by the image pickup lens 304 and then outputs it as analog image signals.

The A/D conversion block 106 converts analog image output signals, which are inputted from the image pickup element 112, into digital video signals in response to an ISO sensitivity that is set. The image processing block 104 performs a filter processing, a color conversion processing, and a gamma/knee processing with respect to image data, which is digitized at the time of still image photographing. Further, the image processing block 104 performs a white balance processing with respect to the digital video signals, which are inputted from the A/D conversion block 106. Furthermore, the image processing block 104 also performs a compression processing of the image data so as to obtain compressed image data such as JPEG (Joint Photographic Experts Group) image data. For example, in the case of a consecutive photographing mode, the image data is temporarily stored in a buffer memory (not shown), the unprocessed image data is read out from the buffer memory, and the image processing block 104 performs the image processing and/or the compression processing with respect to the unprocessed image data, which has been read out from the buffer memory. Therefore, the number of images obtained by consecutive photographing depends on a storage capacity and a storage speed of the buffer memory.

The camera microcomputer 101 confirms a storage capacity of the external memory 113 based on image size predicted value data according to the ISO sensitivity, an image size, and an image quality that are set before image pickup. The input means 105 accepts the user's operation, and transmits operation information to the camera microcomputer 101. The camera microcomputer 101 controls each configuration component of the camera 100 in response to the operation information from the input means 105, and whereby various kinds of functions such as the image pickup are realized. For example, when the release button 305 (see FIG. 3C) as the input means 105 is half-pressed, the camera microcomputer 101 controls each configuration component of the camera 100 so as to perform a photographing preparation operation. At this time, the camera microcomputer 101 calculates, for example, a defocus amount, and controls the lens driving circuit 109 based on the calculated defocus amount so as to focus. After that, when the release button 305 is fully pressed, the camera microcomputer 101 controls each configuration component of the camera 100 so as to perform a photographing operation. Moreover, in addition to the release button 305, the input means 105 is provided with a mode setting dial and the like, and the camera microcomputer 101 detects a selected state of the mode setting dial.

Figure 2A:
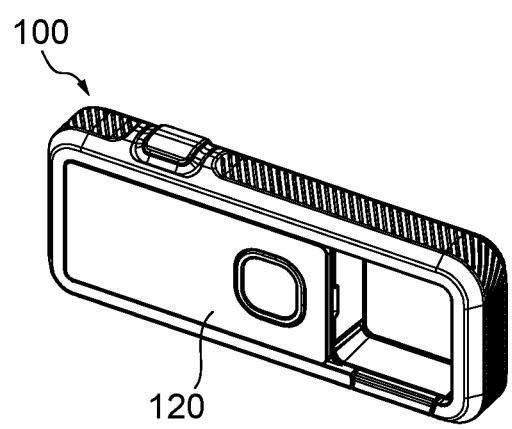
FIG. 2A and FIG. 2B are external appearance perspective views for explaining an attachment state that the mounting component part of FIG. 1 is attached to the camera of FIG. 1.
Figure 2B:
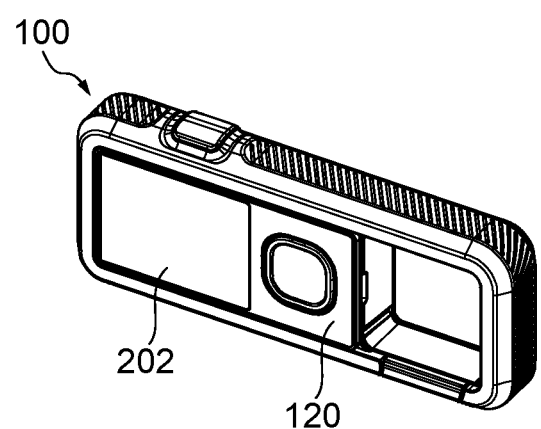

FIG. 2A and FIG. 2B are external appearance perspective views for explaining an attachment state that the mounting component part 120 is attached to the camera 100. FIG. 2A shows a case that the mounting component part 120 is attached to the camera 100 so that a front surface of the mounting component part 120 faces the outside of the camera 100, and FIG. 2B shows a case that the mounting component part 120 is attached to the camera 100 so that the back surface of the mounting component part 120 faces the outside of the camera 100. In the present embodiment, the attachment state shown in FIG. 2A is defined as a state, in which the mounting component part 120 is attached to the camera 100 in a facing-front manner (i.e., frontward), and the attachment state shown in FIG. 2B is defined as a state, in which the mounting component part 120 is attached to the camera 100 in a facing-back manner (i.e., backward). As shown in FIG. 2B, a mirror 202 for selfie is formed on the back surface of the mounting component part 120, and when the user performs selfie image pickup by using the camera 100, the user can confirm himself/herself projected on the mirror 202 as a subject. On the other hand, no mirror is formed on the front surface of the mounting component part 120. Therefore, a reflectance of the front surface of the mounting component part 120 is different from a reflectance of the back surface of the mounting component part 120.

Figure 3A:
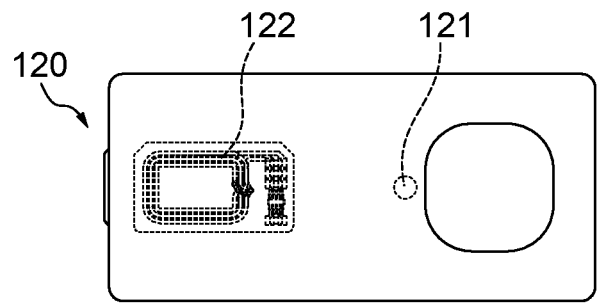
FIG. 3A, FIG. 3B, and FIG. 3C are views for explaining the configuration of the mounting component part of FIG. 1.
Figure 3B:
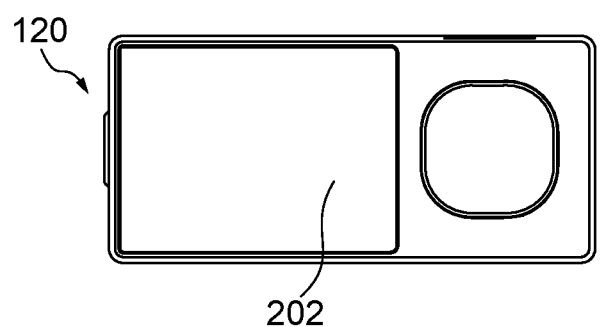
Figure 3C:
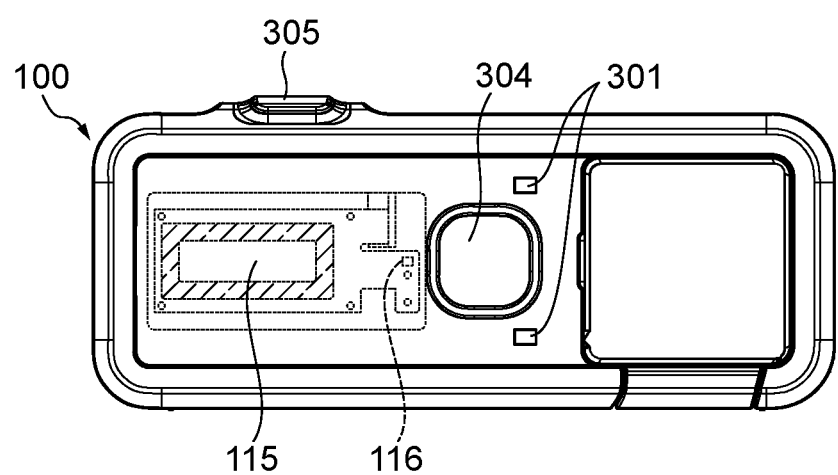

FIG. 3A, FIG. 3B, and FIG. 3C are views for explaining the configuration of the mounting component part 120. FIG. 3A is a view of the mounting component part 120 as viewed from the front surface side, FIG. 3B is a view of the mounting component part 120 as viewed from the back surface side, and FIG. 3C is a front view of the camera 100, to which the mounting component part 120 is not attached. As shown in FIG. 3A, an orientation determination member 121 and the RFID tag 122 are embedded in the mounting component part 120. The orientation determination member 121 is made of, for example, a magnet, and is embedded so that one of an N pole and an S pole of the magnet points to the front surface of the mounting component part 120 and another of the N pole and the S pole points to the back surface of the mounting component part 120. Therefore, it is possible to determine the orientation of the mounting component part 120 by determining a magnetic pole of the orientation determination member 121. Further, as shown in FIG. 3C, in the camera 100, the magnet 301, the image pickup lens 304, the ID tag reader 115, and the orientation detecting means 116 are disposed on a surface, to which the mounting component part 120 is attached (hereinafter, simply referred to as "an attachment surface"). The ID tag reader 115 and the orientation detecting means 116 are embedded in the surface, to which the mounting component part 120 is attached, and the orientation detecting means 116 is configured by, for example, a Hall element, and detects the magnetic pole of the orientation determination member 121. Further, in the camera 100, the release button 305 is disposed at a place different from the surface, to which the mounting component part 120 is attached.

When the mounting component part 120 is attached to the attachment surface of the camera 100, the camera 100 reads the specific information of the mounting component part 120 from the RFID tag 122 by means of the ID tag reader 115 via short-range wireless communications. A timing, at which the specific information of the mounting component part 120 is read, may be a timing, at which the power of the camera 100 is turned on, or a timing, at which a button for performing a reading operation of the specific information is pressed. Further, the timing, at which the specific information of the mounting component part 120 is read, may be a timing, at which a remote manipulation from the smartphone or the like connected wirelessly or the like is performed. Furthermore, the camera 100 may periodically read the specific information of the mounting component part 120 at predetermined intervals.

Further, the camera 100 detects the magnetic pole of the orientation determination member 121 of the mounting component part 120 by means of the orientation detecting means 116, and determines whether the mounting component part 120 is attached frontward or the mounting component part 120 is attached backward. Moreover, determination of the orientation of the mounting component part 120 is not limited to a method described above that uses the magnetic pole, and may be realized by forming physical uneven shapes (i.e., concave and convex shapes) on the attachment surface of the camera 100 and the mounting component part 120, and by a combination of the uneven shapes when the mounting component part 120 is attached to the camera 100.

Figure 4:
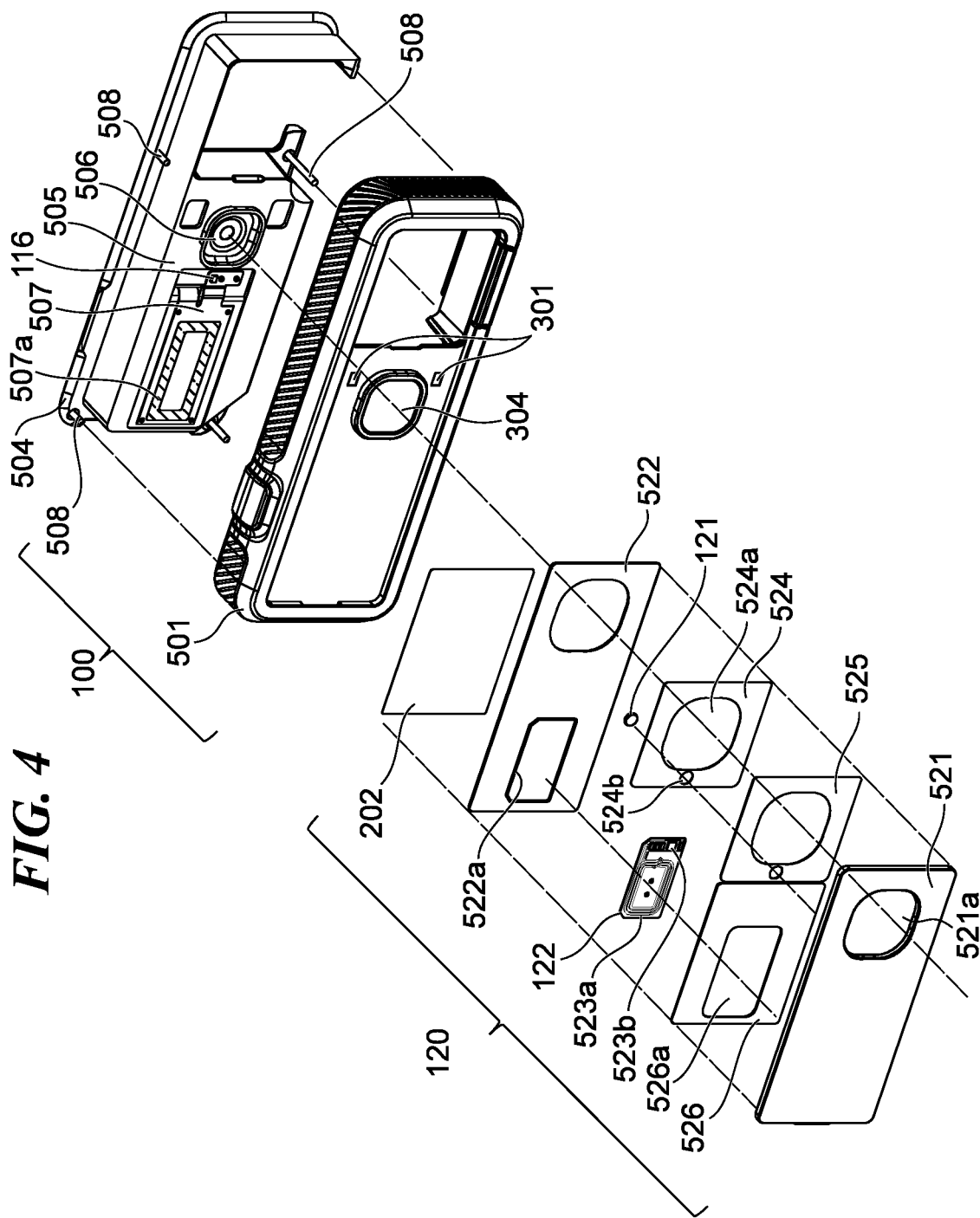
FIG. 4 is an exploded perspective view that shows the configuration of the camera and the mounting component part of FIG. 1.

FIG. 4 is an exploded perspective view that shows the configuration of the camera 100 and the mounting component part 120. As shown in FIG. 4, the camera 100 is configured by combining an inner base 505, a front cover 501, and a rear cover 504 so as to sandwich the inner base 505, which holds an image pickup module 506, a main substrate (not shown), etc., by the front cover 501 and the rear cover 504. The front cover 501 and the rear cover 504 are fixed to each other by fixing screws 508. The magnet 301, which holds the mounting component part 120, and the image pickup lens 304 are fixed to the front cover 501 by a bonding agent or the like. A flexible printed circuit board 507 is disposed on the inner base 505. Further, a loop coil antenna 507a, which constitutes the ID tag reader 115, and the orientation detecting means 116, which is configured by the Hall element, are disposed on the flexible printed circuit board 507.

As shown in FIG. 4, the mounting component part 120 is configured by combining the RFID tag 122, the orientation determination member 121, a sheet metal member 524 (a fixing member), a front cover 521, and a rear cover 522 so as to sandwich the RFID tag 122, the orientation determination member 121, and the sheet metal member 524 by the front cover 521 and the rear cover 522. Both the front cover 521 and the rear cover 522 are molded by a resin such as a polycarbonate resin so as not to interfere with the wireless communications. Further, the front cover 521 and the rear cover 522 are fixed to each other by a double-sided adhesive tape 526, a bonding agent or the like. The RFID tag 122 is configured by a flexible printed circuit board, and has a loop coil antenna 523a and an IC 523b, in which the specific information of the mounting component part 120 is recorded. The RFID tag 122 is positioned with high accuracy and fixed into a position regulating hole 522a of the rear cover 522 by a double-sided adhesive tape (not shown). The sheet metal member 524, which is disposed side by side with the RFID tag 122, is made of, for example, an iron plate, and is fixed to the front cover 521 by a double-sided adhesive tape 525. At this time, the position of the sheet metal member 524 is regulated by a position regulating rib (not shown), which is located around a through hole 521a of the front cover 521.

When the mounting component part 120 is applied to an attracting surface (the attachment surface) of the camera 100, the magnet 301 of the camera 100 and the sheet metal member 524 of the mounting component part 120 face each other, and the magnet 301 attracts the sheet metal member 524. As a result, the mounting component part 120 is attached to the camera 100. In this way, since the mounting component part 120 is attached to the camera 100 by the magnetic force, it is easy to detach the mounting component part 120 from the camera 100, and as a result, the user can easily reattach the mounting component part 120 to the camera 100 by changing the orientation of the mounting component part 120. Further, the sheet metal member 524 is provided with an opening portion 524a corresponding to the image pickup lens 304, and a circular storage hole 524b corresponding to the orientation determination member 121 is provided beside the opening portion 524a. Further, the orientation determination member 121, which is made of the magnet, is inserted into the storage hole 524b and is adhesively fixed so that the N pole points to the front cover 521 (the front surface of the mounting component part 120). Further, the double-sided adhesive tape 526 is provided with a through hole 526a corresponding to the RFID tag 122, and the double-sided adhesive tape 526 is sticked to the front cover 521 and the rear cover 522 so that the through hole 526a coincides with the position regulating hole 522a of the rear cover 522.

The mirror 202 is sticked to a concave portion (not shown) on a front surface of the rear cover 522. The mirror 202 is configured by vapor-depositing a material having a high reflectance that becomes a mirror surface portion on a predetermined sheet material. In the mounting component part 120, the thickness of the mirror 202 is set to be thin enough not to interfere with the short-range wireless communications by the ID tag reader 115 and the RFID tag 122.

The through hole 521a of the front cover 521 and the opening portion 524a of the sheet metal member 524 are formed so as to face the image pickup lens 304 of the camera 100 when the mounting component part 120 is attached to the camera 100. Further, opening portions similar to the through hole 521a and the opening portion 524a are also formed on the double-sided adhesive tape 525 and the rear cover 522. As a result, even in the case that the mounting component part 120 is attached to the camera 100, the mounting component part 120 does not cover the image pickup lens 304 and does not interfere with photographing. Moreover, as shown in FIG. 4, the RFID tag 122, the orientation determination member 121, the sheet metal member 524, and the opening portion 524a of the sheet metal member 524 are disposed on substantially the same plane.

Figure 5A:
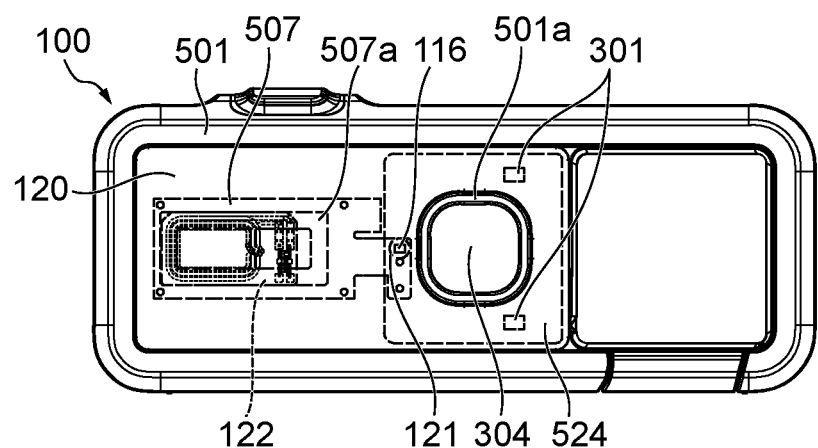
FIG. 5A, FIG. 5B, FIG. 5C, FIG. 5D, and FIG. 5E are views for explaining an attachment method of attaching the mounting component part of FIG. 1 to the camera of FIG. 1.
Figure 5B:
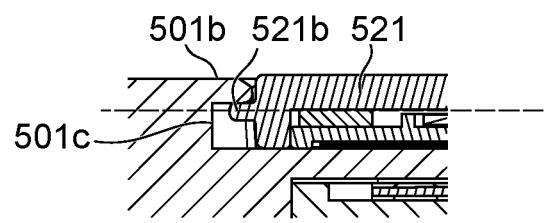
Figure 5C:
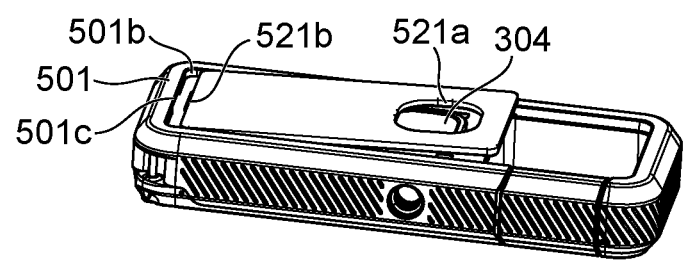
Figure 5D:
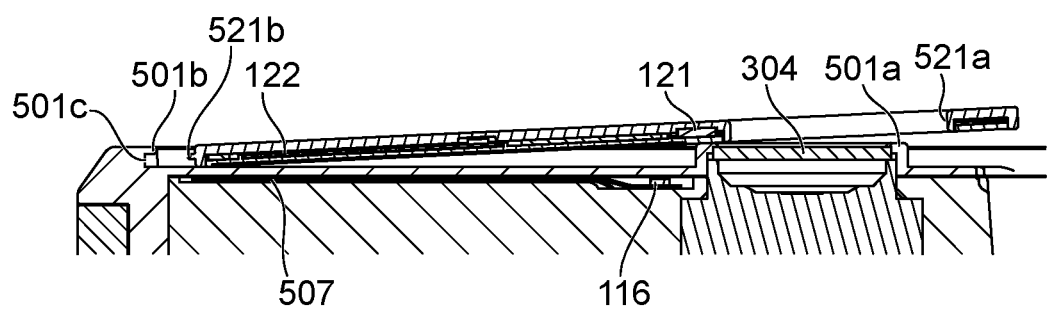
Figure 5E:
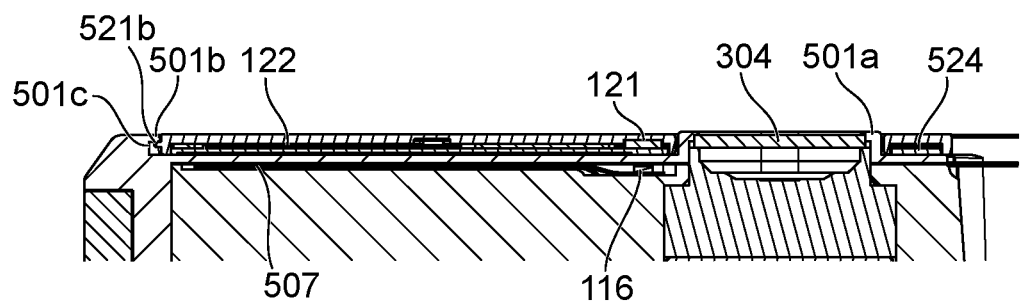

FIG. 5A, FIG. 5B, FIG. 5C, FIG. 5D, and FIG. 5E are views for explaining an attachment method of attaching the mounting component part 120 to the camera 100. FIG. 5A is a front view that shows the state, in which the mounting component part 120 is attached to the camera 100 in the facing-front manner (i.e., frontward), and for ease of understanding, some of respective configuration components of the camera 100 and the mounting component part 120 are drawn so as to be seen through. FIG. 5B is a partially enlarged cross sectional view that shows a state of mechanical locking, in which the mounting component part 120 is mechanically locked to the camera 100. FIG. 5C is a perspective view that shows a state, in which the mounting component part 120 is not correctly attached to the camera 100. FIG. 5D is a partially enlarged cross sectional view that shows a state of mechanical locking in the state, in which the mounting component part 120 is not correctly attached to the camera 100. FIG. 5E is a partially enlarged cross sectional view that shows a state of mechanical locking in a state, in which the mounting component part 120 is correctly attached to the camera 100.

When the mounting component part 120 is attached to the camera 100, the position of the mounting component part 120 is regulated by a standing wall portion 501b, which is formed around the attachment surface of the front cover 501 of the camera 100, and a convex shape 501a, which is formed around the image pickup lens 304. At this time, the convex shape 501a is fitted into the through hole 521a of the front cover 521, and as a result, positioning of the mounting component part 120 with respect to the camera 100 is stabilized.

When the mounting component part 120 is attached to the camera 100, in front view, the RFID tag 122 of the mounting component part 120 overlaps with the ID tag reader 115 (the loop coil antenna 507a) of the camera 100. As a result, the short-range wireless communications by the ID tag reader 115 and the RFID tag 122 is smoothly performed, and it is possible to reliably read the specific information of the mounting component part 120. Further, at this time, as will be described later in FIG. 6, the orientation detecting means 116 of the camera 100 detects the magnetic pole of the orientation determination member 121 of the mounting component part 120 so as to determine the orientation of the mounting component part 120, which is attached to the camera 100.

Further, when the mounting component part 120 is attached to the camera 100, in the front view, the orientation determination member 121 of the mounting component part 120 overlaps with the orientation detecting means 116 of the camera 100. Here, in the mounting component part 120, the orientation determination member 121 is disposed at a substantially center of the mounting component part 120 in a vertical direction. In the case of changing the orientation of the mounting component part 120 and then attaching the mounting component part 120 to the camera 100, although the mounting component part 120 is inverted with respect to the top and the bottom, a position with respect to the top and the bottom of the orientation determination member 121, which is disposed at the substantially center of the mounting component part 120 in the vertical direction, does not change. As a result, regardless of the orientation of the mounting component part 120, which is attached to the camera 100, the orientation detecting means 116 can face the orientation determination member 121, and it is possible to reliably detect the magnetic pole of the orientation detecting means 116 by means of the orientation determination member 121. As a result, it is possible to determine the orientation of the mounting component part 120 without increasing the number of the orientation detecting means 116 and the orientation determination member 121.

A rib shape 521b is formed at an end portion of the front cover 521 of the mounting component part 120. Further, the standing wall portion 501b of the front cover 501 of the camera 100 is formed in a cross sectional eaves shape, and has an under-eaves portion 501c. When the mounting component part 120 is attached to the camera 100, the rib shape 521b enters the under-eaves portion 501c, so that the mounting component part 120 is mechanically locked to the camera 100. Further, the under-eaves portion 501c is molded so that the rib shape 521b can enter the under-eaves portion 501c regardless of the orientation of the mounting component part 120, which is attached to the camera 100. As a result, it is possible to mechanically prevent the mounting component part 120 from rising or falling off from the camera 100 regardless of the orientation of the mounting component part 120, which is attached to the camera 100. Moreover, a concave portion is formed at the end portion of the front cover 521 of the mounting component part 120, a convex shape is formed on the standing wall portion 501b of the front cover 501 of the camera 100, and the same effect can be obtained by this convex shape entering the above-mentioned concave portion.

By the way, since the mounting component part 120 is attracted to the camera 100 by the magnet 301, the mounting component part 120 may be held by the camera 100 even in the case that the mounting component part 120 is not correctly attached to the camera 100 (see FIG. 5C). In such a state, the image pickup lens 304 does not face the through hole 521a of the front cover 521, a part of the image pickup lens 304 is covered with the mounting component part 120, and as a result, image pickup by the camera 100 becomes difficult. On the other hand, in such a state, the orientation determination member 121 and the orientation detecting means 116 do not face each other (see FIG. 5D), and the orientation detecting means 116 cannot detect the magnetic force of the orientation determination member 121 or the orientation detecting means 116 can detect only an extremely weak magnetic force of the orientation determination member 121. Therefore, in the case that the magnetic force of the orientation determination member 121 cannot be detected or only the extremely weak magnetic force of the orientation determination member 121 can be detected, it may be determined that the mounting component part 120 has not been correctly attached to the camera 100. In this case, the user may be informed that the mounting component part 120 has not been correctly attached to the camera 100 by emitting a warning sound from a speaker (not shown) of the camera 100, or making an LED (Light Emitting Diode) lamp (not shown) of the camera 100 emit light.

Further, in the mounting component part 120, the orientation determination member 121, the sheet metal member 524, and the RFID tag 122 are disposed in a space between the front cover 521 and the rear cover 522, which exists at a substantially center of the mounting component part 120 in a thickness direction (see FIG. 5E). As a result, it is possible to prevent that there is a difference in a holding force of the mounting component part 120 by the magnet 301 and an ability for detecting the magnetic force of the orientation determination member 121 by the orientation detecting means 116 depending on the orientation of the mounting component part 120, which is attached to the camera 100.

Figure 6:
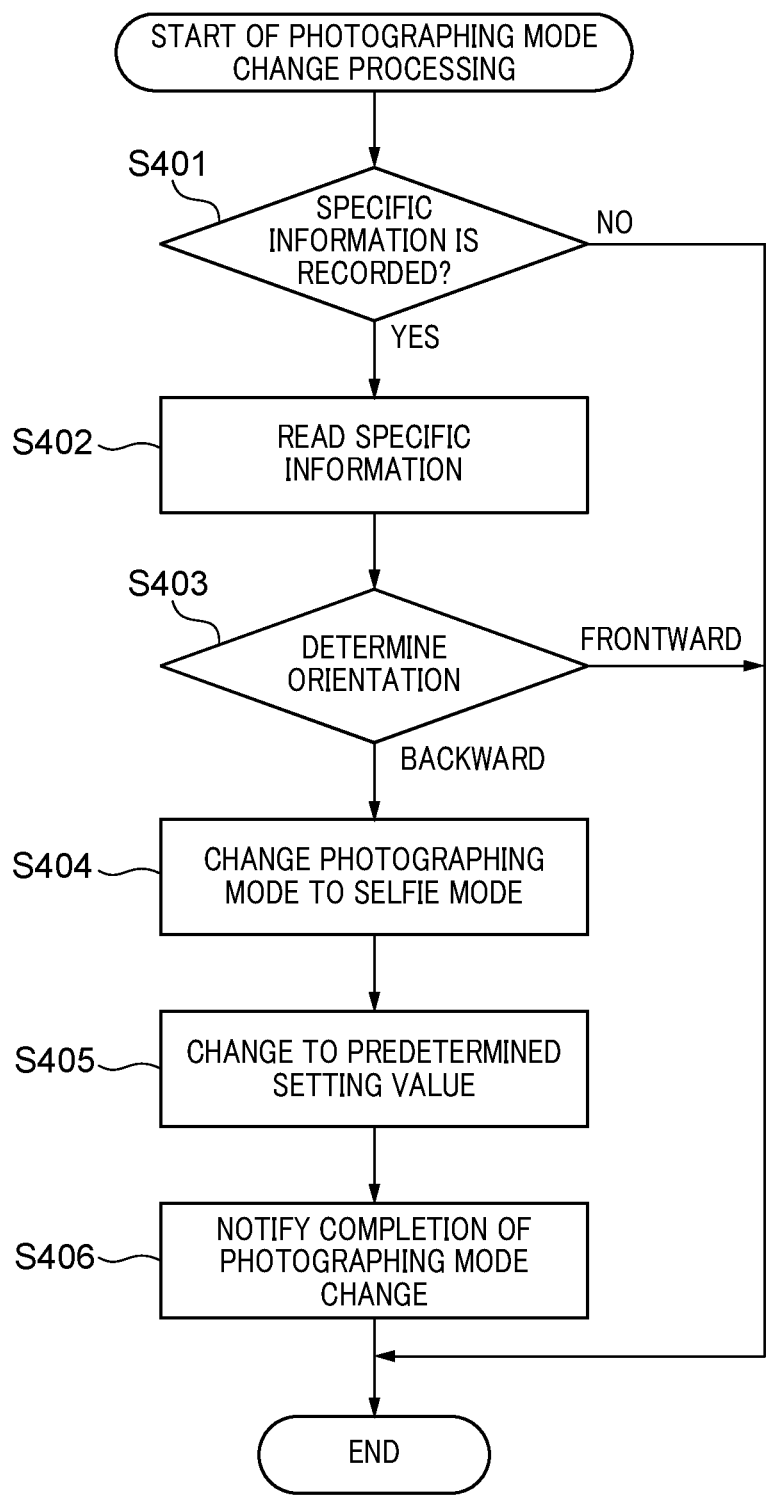
FIG. 6 is a flowchart that shows a photographing mode change processing of the camera according to the first embodiment.

FIG. 6 is a flowchart that shows a photographing mode change processing of the camera 100 according to the first embodiment. The camera microcomputer 101 of the camera 100 executes the photographing mode change processing of FIG. 6 according to a program, which is expanded, for example, in a RAM (Random Access Memory) (not shown).

At first, when the mounting component part 120 is attached to the camera 100, the camera microcomputer 101 uses the ID tag reader 115 to determine whether or not the specific information of the mounting component part 120 is recorded in the RFID tag 122 (a step S401). In the case of being determined that the specific information of the mounting component part 120 is not recorded in the RFID tag 122 (NO in the step S401), the photographing mode change processing of FIG. 6 ends. On the other hand, in the case of being determined that the specific information of the mounting component part 120 is recorded in the RFID tag 122 (YES in the step S401), the ID tag reader 115 reads the specific information of the mounting component part 120 (for example, information that the mounting component part 120 includes the mirror 202) from the RFID tag 122 (a step S402).

Next, the orientation detecting means 116 detects the magnetic pole of the orientation determination member 121 to determine the orientation of the mounting component part 120, which is attached to the camera 100 (a step S403). In the present embodiment, for example, in the case that the orientation detecting means 116 detected the N pole of the orientation determination member 121, since the front cover 521 of the mounting component part 120 is in a state of facing the attachment surface of the camera 100, it is determined that the mounting component part 120 is attached backward.

In the step S403, in the case of being determined that the mounting component part 120 is attached frontward, the photographing mode change processing of FIG. 6 ends. On the other hand, in the case of being determined that the mounting component part 120 is attached backward, since the user can project himself/herself on the mirror 202, the camera microcomputer 101 changes a photographing mode of the camera 100 to a selfie mode (a step S404). Further, each setting value of the camera 100 is changed to a setting value predetermined by the user (a step S405). The setting value predetermined by the user corresponds to a focus setting such as face priority or pupil priority, an exposure setting, an effect setting such as a skin-beautifying effect, or the number of seconds set in a self-timer.

When the change of the setting value in the step S405 is completed, the camera microcomputer 101 notifies the user of the completion of photographing mode change (a step S406). As a method of notifying the completion of photographing mode change, for example, a method of emitting a sound from the speaker or the like, a method of light emission of the LED lamp, or a method of vibrating by a motor (not shown) built in the camera 100 may be used. After that, the camera microcomputer 101 ends the photographing mode change processing of FIG. 6, and shifts the camera 100 to an image pickup standby state. Moreover, in the case of being determined that the specific information of the mounting component part 120 is not recorded in the RFID tag 122 in the step S401, or in the case of being determined that the mounting component part 120 is attached frontward in the step S403, the camera microcomputer 101 may end the photographing mode change processing of FIG. 6 after changing the photographing mode of the camera 100 to a normal photographing mode.

According to the present embodiment, since the photographing mode of the camera 100 is changed in response to the orientation of the mounting component part 120, which is attached to the camera 100, the user does not need to hold the mounting component part 120, which is detached to change the photographing mode, separately from the camera 100. As a result, the user can easily change the photographing mode of the camera 100 without fear of losing the mounting component part 120, etc.

Further, in the present embodiment, in the case that it is determined that the mounting component part 120 is attached backward and the photographing mode is changed to the selfie mode, each setting value of the camera 100 is changed to the setting value predetermined by the user. As a result, the user does not have to perform the focus setting, the exposure setting, and the effect setting, which are suitable for the selfie mode, so that labor and time required to change the photographing mode can be greatly reduced.

Further, in the present embodiment, not only the mounting component part 120 is attracted to the camera 100 by the magnetic force, but also the mounting component part 120 is mechanically locked to the camera 100 by using the rib shape 521b and the under-eaves portion 501c. As a result, it is possible to reliably prevent the mounting component part 120, which is attached to the camera 100, from coming off the camera 100 even in an outdoor scene that the movement of the user becomes intense.

Moreover, in the present embodiment, as an example of changing the function of the camera 100 in response to the orientation of the mounting component part 120, which is attached to the camera 100, a case that the photographing mode of the camera 100 is changed has been described. However, changing the function of the camera 100 in response to the orientation of the mounting component part 120, which is attached to the camera 100, is not limited to changing the photographing mode. For example, in the case that the specific animation character is printed on the back surface of the mounting component part 120 instead of the mirror 202, when it is determined that the mounting component part 120 is attached backward, an operation sound of the camera 100 may be changed to a voice of the character. Furthermore, a frame using a character or an effect that a subject is reflected together with a character may be added to the photographed image of the camera 100.

Next, a second embodiment of the present invention will be described. The components, operations, and effects of the second embodiment are basically the same as those of the first embodiment described above, and the second embodiment differs from the first embodiment in that the function of the camera is changed in response to a position around an optical axis of the image pickup lens of the mounting component part, which is attached to the camera. Therefore, the description of duplicated components, operations, and effects will be omitted, and different components, operations, and effects will be described below.

Figure 7A:
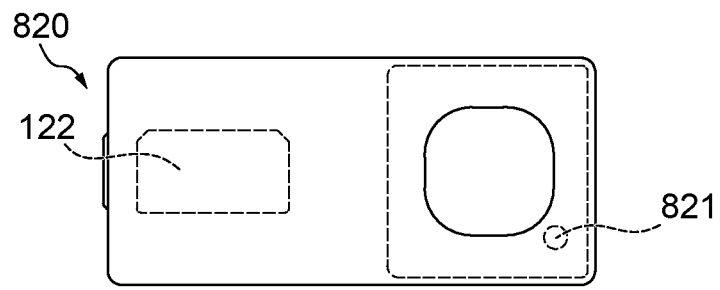
FIG. 7A, FIG. 7B, and FIG. 7C are views for explaining a configuration of a camera as an image pickup apparatus according to a second embodiment of the present invention and a mounting component part that can be attached to the camera.
Figure 7B:
Figure 7C:
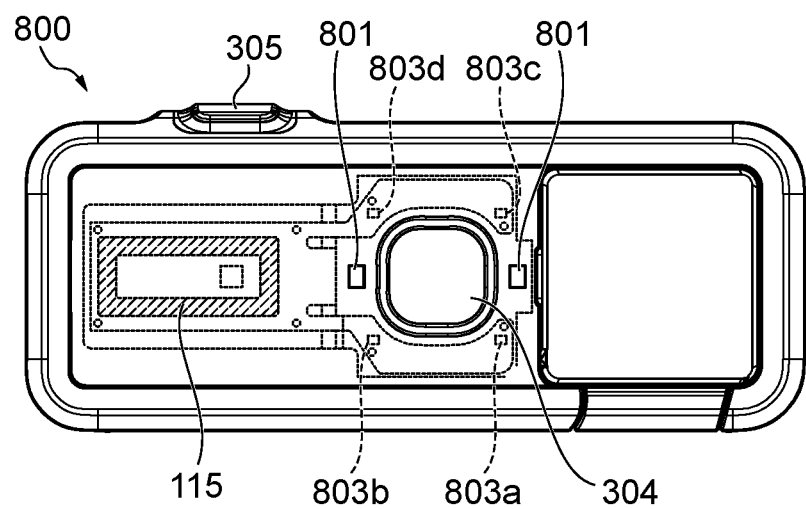

FIG. 7A, FIG. 7B, and FIG. 7C are views for explaining a configuration of a camera as an image pickup apparatus according to the second embodiment of the present invention and a mounting component part that can be attached to the camera. FIG. 7A is a view of a mounting component part 820 as viewed from the front surface side, FIG. 7B is a view of the mounting component part 820 as viewed from the back surface side, and FIG. 7C is a front view of a camera 800, to which the mounting component part 820 is not attached. As shown in FIG. 7A, a position determination member 821, which is made of, for example, a magnet, and the RFID tag 122 are embedded in the mounting component part 820. Further, as shown in FIG. 7C, in the camera 800, a magnet 801, the image pickup lens 304, the ID tag reader 115, and four position determination means 803a to 803d are disposed on an attachment surface, to which the mounting component part 820 is attached. Each of the four position determination means 803a to 803d is configured by, for example, a Hall element, and detects a magnetic field of the position determination member 821.

When the mounting component part 820 is attached to the attachment surface of the camera 800, the camera 800 reads specific information of the mounting component part 820 from the RFID tag 122 by means of the ID tag reader 115 via the short-range wireless communications. Moreover, a timing, at which the specific information of the mounting component part 820 is read, is the same as the timing, at which the specific information of the mounting component part 120 of the first embodiment is read.

In the present embodiment, it is possible to attach the mounting component part 820 to the camera 800 at a plurality of positions around an optical axis of the image pickup lens 304 (hereinafter, simply referred to as "a lens optical axis"). Specifically, as shown in FIG. 8A, FIG. 8B, FIG. 8C, and FIG. 8D described later, it is possible to attach the mounting component part 820 to the camera 800 in 90° increments around the lens optical axis. In the camera 800, the four position determination means 803a to 803d are disposed in 90° increments around the lens optical axis. Further, in the mounting component part 820, the position determination member 821 is disposed so as to face any one of the four position determination means 803a to 803d when the mounting component part 820 is attached to the camera 800. Therefore, in the present embodiment, by determining which of the four position determination means 803a to 803d has detected the magnetic field of the position determination member 821, it is possible to determine at which rotation angle around the lens optical axis the mounting component part 820 is attached to the camera 800. Moreover, determination of at which rotation angle around the lens optical axis the mounting component part 820 is attached to the camera 800 is not limited to a method described above that uses the magnetic field. For example, the determination of at which rotation angle around the lens optical axis the mounting component part 820 is attached to the camera 800 may be realized by forming physical uneven shapes (i.e., concave and convex shapes) on the attachment surface of the camera 800 and the mounting component part 820, and by determining which concave shape the convex shape fits into.

Figure 8A:
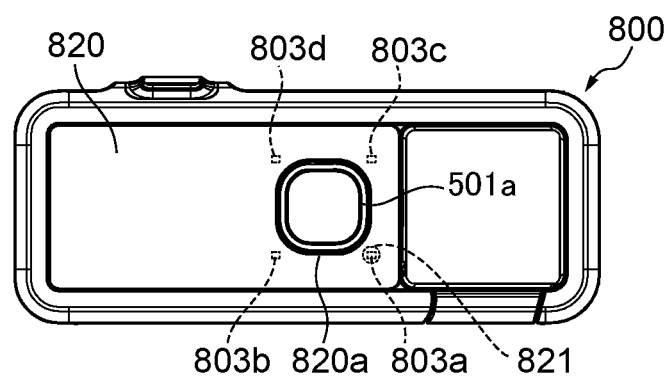
FIG. 8A, FIG. 8B, FIG. 8C, and FIG. 8D are views for explaining a concrete attachment aspect of attaching the mounting component part to the camera in the second embodiment.

FIG. 8A, FIG. 8B, FIG. 8C, and FIG. 8D are views for explaining a concrete attachment aspect of attaching the mounting component part 820 to the camera 800. FIG. 8A shows a case that the mounting component part 820 is attached to the camera 800 at a rotation angle of 0° around the lens optical axis. In this case, the position determination member 821 faces the position determination means 803a. Therefore, a case that the position determination means 803a has detected the magnetic field of the position determination member 821 corresponds to the case that the mounting component part 820 is attached to the camera 800 at a rotation angle of 0° around the lens optical axis. In the present embodiment, when the position determination means 803a detects the magnetic field of the position determination member 821, a photographing mode of the camera 800 is set to a normal mode.

Figure 8B:
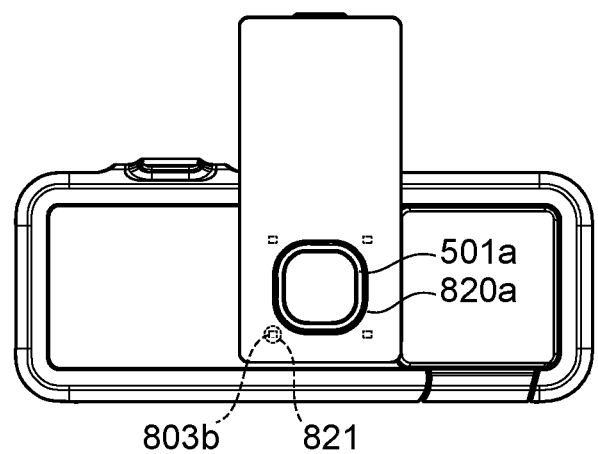

FIG. 8B shows a case that the mounting component part 820 is attached to the camera 800 at a rotation angle of 90° around the lens optical axis. In this case, the position determination member 821 faces the position determination means 803b. Therefore, a case that the position determination means 803b has detected the magnetic field of the position determination member 821 corresponds to the case that the mounting component part 820 is attached to the camera 800 at a rotation angle of 90° around the lens optical axis. In the present embodiment, when the position determination means 803b detects the magnetic field of the position determination member 821, the photographing mode of the camera 800 is set to a sport mode.

Figure 8C:
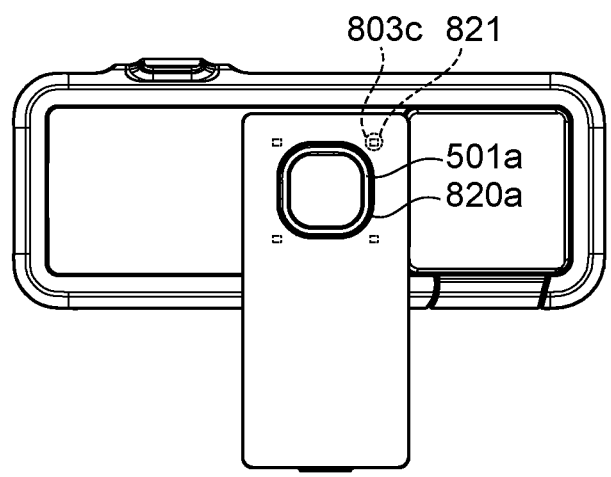

FIG. 8C shows a case that the mounting component part 820 is attached to the camera 800 at a rotation angle of 270° around the lens optical axis. In this case, the position determination member 821 faces the position determination means 803c. Therefore, a case that the position determination means 803c has detected the magnetic field of the position determination member 821 corresponds to the case that the mounting component part 820 is attached to the camera 800 at a rotation angle of 270° around the lens optical axis. In the present embodiment, when the position determination means 803c detects the magnetic field of the position determination member 821, the photographing mode of the camera 800 is set to a night view mode.

Figure 8D:
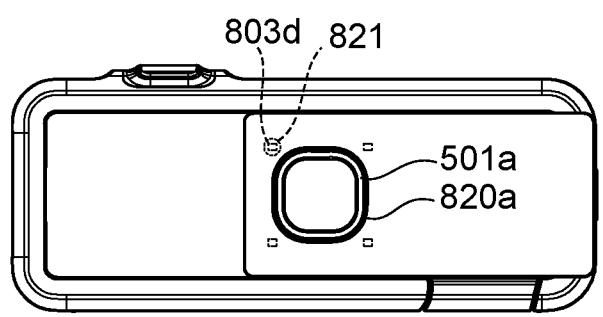

FIG. 8D shows a case that the mounting component part 820 is attached to the camera 800 at a rotation angle of 180° around the lens optical axis. In this case, the position determination member 821 faces the position determination means 803d. Therefore, a case that the position determination means 803d has detected the magnetic field of the position determination member 821 corresponds to the case that the mounting component part 820 is attached to the camera 800 at a rotation angle of 180° around the lens optical axis. In the present embodiment, when the position determination means 803d detects the magnetic field of the position determination member 821, the photographing mode of the camera 800 is set to the selfie mode.

Moreover, in any mode, after setting the said mode, each setting value of the camera 800 is changed to a setting value predetermined by the user corresponding to the said mode.

In the present embodiment, the convex shape 501a, which is formed around the image pickup lens 304, is formed in a substantially square shape in the front view, and a through hole 820a, which is formed in a substantially square shape in the front view at a position facing the image pickup lens 304, is formed in the mounting component part 820. When the mounting component part 820 is attached to the camera 800, the convex shape 501a is fitted into the through hole 820a, and as a result, the rotation angle around the lens optical axis of the camera 800 with respect to the mounting component part 820 is specified, and positioning of the mounting component part 820 with respect to the camera 800 is stabilized. Moreover, considering the ease of fitting the convex shape 501a into the through hole 820a, four corners of the convex shape 501a and four corners of the through hole 820a are finished in an R shape.

Figure 9:
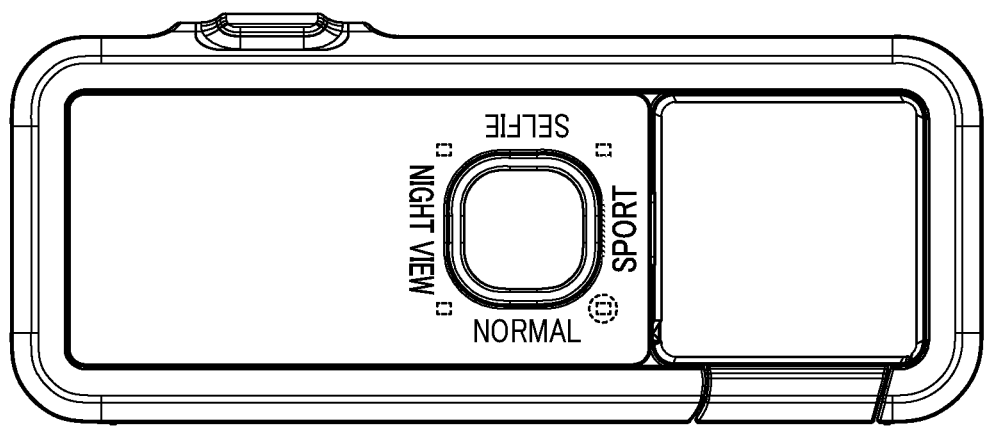
FIG. 9 is a view that shows an aspect of names of respective photographing modes that are printed on a front surface of the mounting component part.

Each of the four position determination means 803a to 803d can detect not only the magnetic field of the position determination member 821 but also the magnetic pole of the position determination member 821. Therefore, for example, if the position determination member 821 is disposed so that an N pole or an S pole of the position determination member 821 points to a front surface of the mounting component part 820, each of the four position determination means 803a to 803d detects not only the magnetic field of the position determination member 821 but also the magnetic pole of the position determination member 821, thereby the orientation of the mounting component part 820 can also be detected. A method for determining the orientation of the mounting component part 820 is the same as the method for determining the orientation of the mounting component part 120 in the first embodiment. In this case, the camera 800 can detect eight kinds of positional relationships with the mounting component part 820, and as a result, the camera 800 can set up to eight photographing modes. Moreover, the shapes of the convex shape 501a and the through hole 820a in the front view are not limited to the substantially square shape (a tetragon shape), and may be formed in, for example, a substantially regular pentagonal shape or a substantially regular octagonal shape. As a result, it is possible to increase the number of the positional relationships with the mounting component part 820 that can be detected by the camera 800, and it is possible to increase the number of the photographing modes that can be set by the camera 800. However, in this way, when the number of the photographing modes that can be set by the camera 800 increases, the user may forget which rotation angle corresponds to which photographing mode. Therefore, as shown in FIG. 9, names (displays) of the photographing modes corresponding to respective rotation angles around the lens optical axis may be printed on the front surface of the mounting component part 820.

Figure 10:
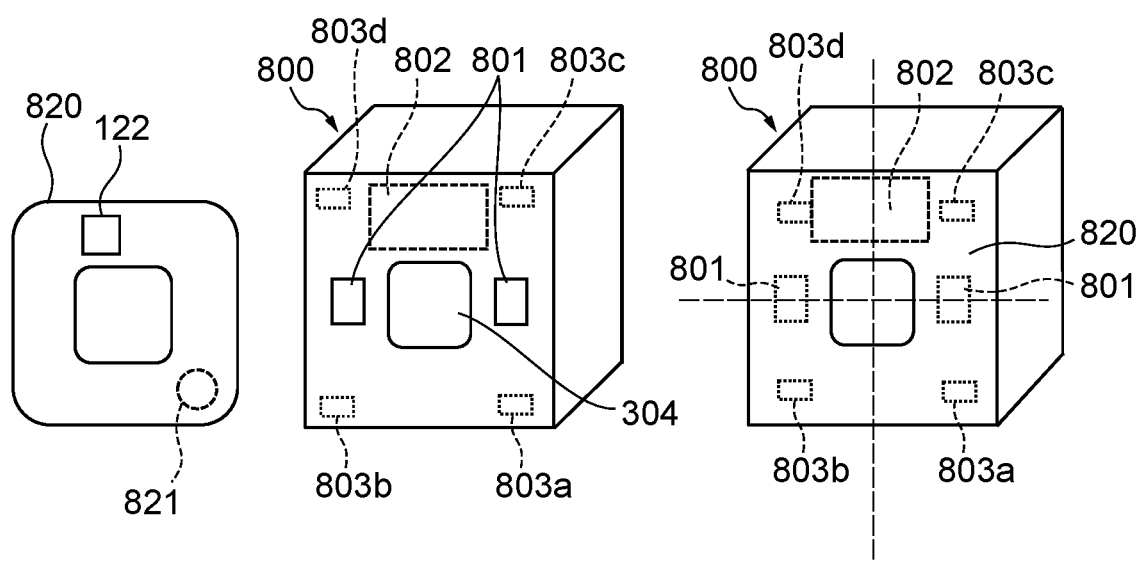
FIG. 10 is a view for explaining a first modification of the camera and the mounting component part of FIG. 8A, FIG. 8B, FIG. 8C, and FIG. 8D.

Further, in the present embodiment, although the mounting component part 820 and the camera 800 have a rectangular shape in the front view, as shown in FIG. 10, the mounting component part 820 and the camera 800 may be configured to have a substantially square shape in the front view. In this case, since a thing that a part of the mounting component part 820 protrudes from the camera 800 for example as shown in FIG. 8B and FIG. 8C will not occur, it is possible to improve the portability of the camera 800, and this configuration is especially useful in the outdoor scene that the user moves violently.

Figure 11:
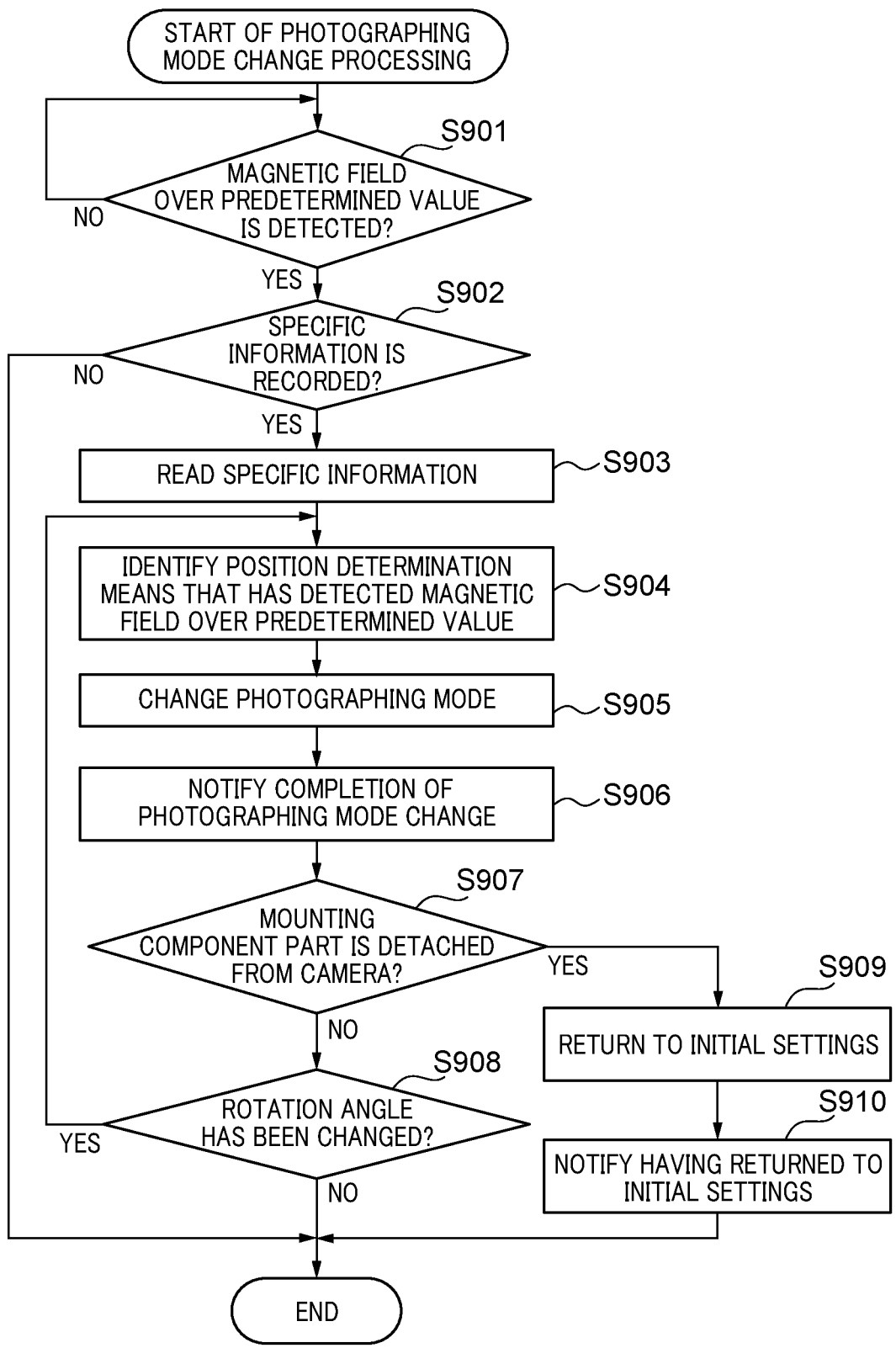
FIG. 11 is a flowchart that shows a photographing mode change processing of the camera according to the second embodiment.

FIG. 11 is a flowchart that shows a photographing mode change processing of the camera 800 according to the second embodiment. The camera microcomputer 101 of the camera 800 executes the photographing mode change processing of FIG. 11 according to a program, which is expanded, for example, in the RAM (not shown).

At first, when the mounting component part 820 is attached to the camera 800, the camera microcomputer 101 determines whether or not any one of the four position determination means 803a to 803d has detected a magnetic field over a predetermined value (a step S901). In the case that any one of the four position determination means 803a to 803d has not detected the magnetic field over the predetermined value, the processing returns to the step S901. On the other hand, in the case that any one of the four position determination means 803a to 803d has detected the magnetic field over the predetermined value, the camera microcomputer 101 uses the ID tag reader 115 to determine whether or not the specific information of the mounting component part 820 is recorded in the RFID tag 122 (a step S902). In the case of being determined that the specific information of the mounting component part 820 is not recorded in the RFID tag 122 (NO in the step S902), the photographing mode change processing of FIG. 11 ends. On the other hand, in the case of being determined that the specific information of the mounting component part 820 is recorded in the RFID tag 122 (YES in the step S902), the ID tag reader 115 reads the specific information of the mounting component part 820 from the RFID tag 122 (a step S903). The specific information of the mounting component part 820 corresponds to information that the mounting component part 820 can be attached to the camera 800 by rotating around the lens optical axis.

Next, the camera microcomputer 101 identifies which of the four position determination means 803a to 803d has detected the magnetic field over the predetermined value (a step S904). After that, the camera microcomputer 101 changes the photographing mode of the camera 800 in response to the rotation angle around the lens optical axis of the mounting component part 820, which is attached to the camera 800. Specifically, the camera microcomputer 101 changes the photographing mode of the camera 800 in response to the position determination means 803 that has detected the magnetic field over the predetermined value (a step S905). For example, in the case that the position determination means 803a has detected the magnetic field over the predetermined value (i.e., in the case that the rotation angle around the lens optical axis of the mounting component part 820 is 0°, the camera microcomputer 101 maintains the photographing mode of the camera 800 in the normal mode. In the case that the position determination means 803b has detected the magnetic field over the predetermined value (i.e., in the case that the rotation angle around the lens optical axis of the mounting component part 820 is 90°, the camera microcomputer 101 changes the photographing mode of the camera 800 to the sport mode. In the case that the position determination means 803c has detected the magnetic field over the predetermined value (i.e., in the case that the rotation angle around the lens optical axis of the mounting component part 820 is 270°, the camera microcomputer 101 changes the photographing mode of the camera 800 to the night view mode. In the case that the position determination means 803d has detected the magnetic field over the predetermined value (i.e., in the case that the rotation angle around the lens optical axis of the mounting component part 820 is 180°, the camera microcomputer 101 changes the photographing mode of the camera 800 to the selfie mode. Further, at this time, each setting value of the camera 800 is changed to the setting value predetermined by the user corresponding to the mode changed. After that, the camera microcomputer 101 notifies the user of the completion of photographing mode change (a step S906). A method of notifying the completion of photographing mode change in the second embodiment is the same as the method of notifying the completion of photographing mode change in the first embodiment.

Next, the camera microcomputer 101 determines whether or not the mounting component part 820 is detached from the camera 800 (a step S907). In the case that the mounting component part 820 is detached from the camera 800, the camera microcomputer 101 returns settings of the camera 800 to initial settings (a step S909). For example, the camera microcomputer 101 returns the photographing mode to the normal mode. After that, the camera microcomputer 101 notifies the user that the settings of the camera 800 has returned to the initial settings (a step S910), and ends the photographing mode change processing of FIG. 11. On the other hand, in the case that the mounting component part 820 is not detached from the camera 800, the camera microcomputer 101 determines whether or not the rotation angle around the lens optical axis of the mounting component part 820 with respect to the camera 800 has been changed (a step S908). This determination is made based on whether or not the position determination means 803, which has detected the magnetic field over the predetermined value, has been changed. In the case that the rotation angle around the lens optical axis of the mounting component part 820 has been changed (YES in the step S908), the processing returns to the step S904. On the other hand, in the case that the rotation angle around the lens optical axis of the mounting component part 820 has not been changed (NO in the step S908), the camera microcomputer 101 ends the photographing mode change processing of FIG. 11, and shifts the camera 800 to the image pickup standby state.

According to the present embodiment, since the photographing mode of the camera 800 is changed in response to the rotation angle around the lens optical axis of the mounting component part 820, which is attached to the camera 800, the user does not need to hold the mounting component part 820, which is detached to change the photographing mode, separately from the camera 800. As a result, as with the first embodiment, the user can easily change the photographing mode of the camera 800 without fear of losing the mounting component part 820, etc.

Figure 12:
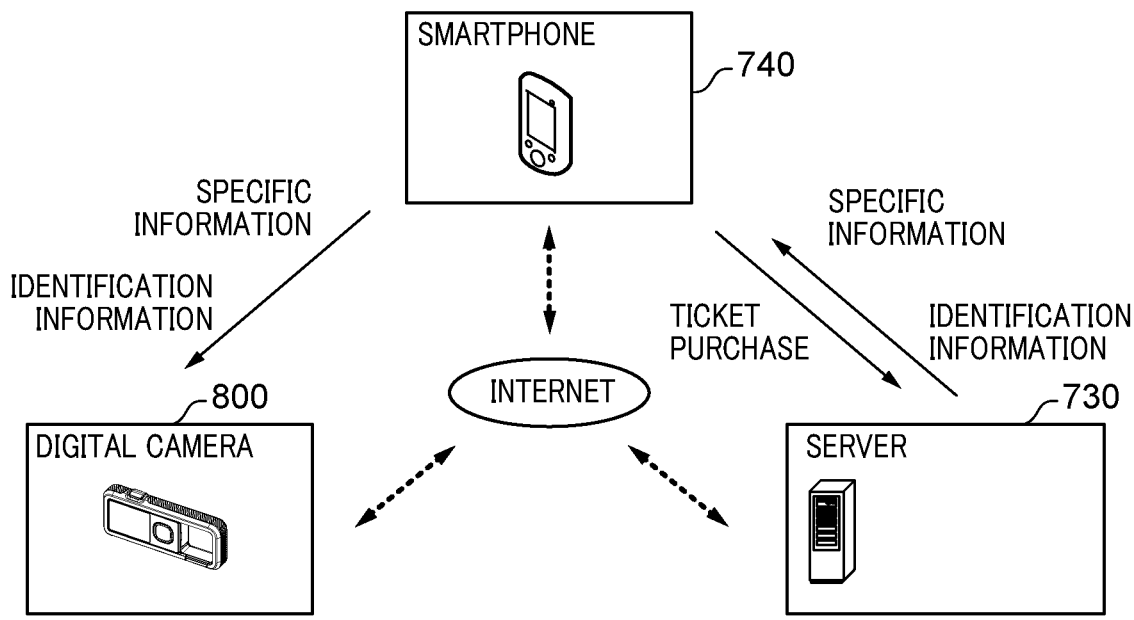
FIG. 12 is a conceptual diagram for explaining the concept of a communication system that includes a camera, a smartphone, and a server via the Internet.

FIG. 12 is a conceptual diagram for explaining the concept of a communication system that includes a camera, a smartphone, and a server via the Internet. For example, in the communication system, the camera 800, which is a digital camera, a server 730, and a smartphone 740 (an information processing terminal) have communication functions, respectively, and are connected to each other via the Internet. In such a communication system, for example, as shown in a table of FIG. 12, charging information may be added to each photographing mode of the camera 800. As a timing for adding the charging information to each photographing mode, for example, a case that the user uses the smartphone 740 instead of an admission ticket is possible. In this case, at a sports match venue, an event venue, a theme park, or the like, the user accesses the server 730 from the smartphone 740, performs user registration, and purchases an activation ticket for a function that can be added. This activation ticket includes the specific information of each photographing mode, which is recorded in the RFID tag 122 of the mounting component part 820 attached to the camera 800, and identification information charging information, which indicates whether or not the use of each photographing mode is charged.

At first, when the activation ticket is purchased, the identification information charging information is added to the smartphone 740. Then, when the camera 800 is connected to the smartphone 740, the identification information charging information is added to the camera 800 and is recorded in the RFID tag 122. Further, an identification bit, which indicates whether or not the identification information charging information is recorded, is recorded in a nonvolatile storage area of the RFID tag 122, and in the case that the identification information charging information is recorded, "1" is recorded as the identification bit. Further, the identification information charging information is used in activation of the specific information of the mounting component part 820, which is recorded.

Although the preferred embodiments of the present invention have been described above, the present invention is not limited to the above-described embodiments, and various modifications and changes can be made within the scope of the gist thereof.

Figure 13A:
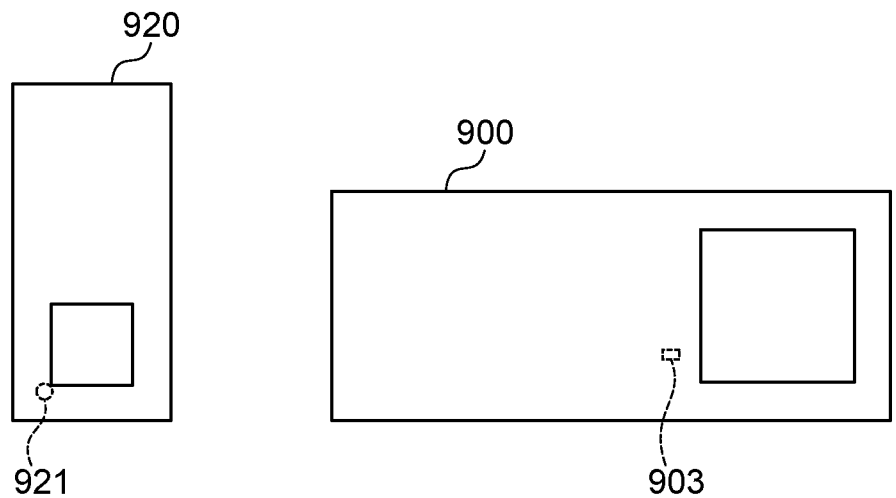
FIG. 13A, FIG. 13B, and FIG. 13C are views for explaining a second modification of the camera and the mounting component part of FIG. 8A, FIG. 8B, FIG. 8C, and FIG. 8D.
Figure 13B:
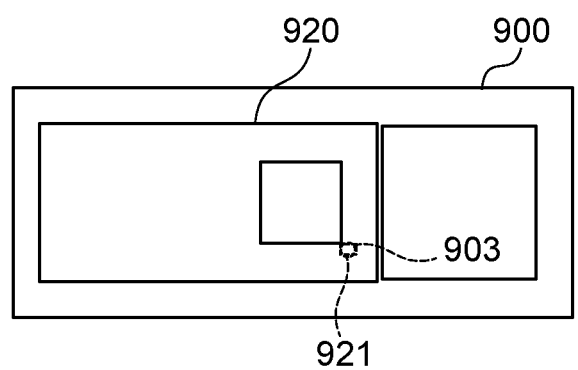
Figure 13C:
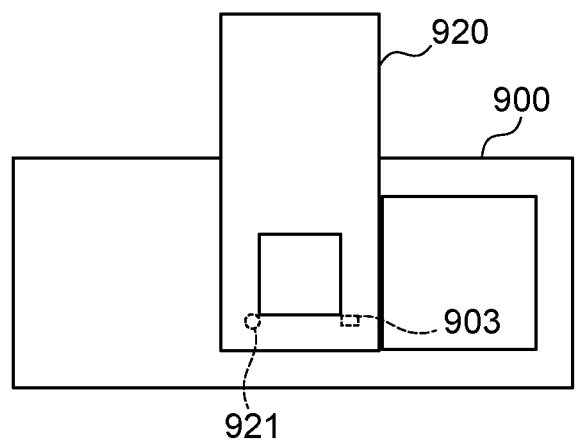

For example, in the second embodiment that the mounting component part 820 can be attached to the camera 800 by rotating around the lens optical axis, although the camera 800 is provided with four position determination means 803a to 803d, the number of position determination members is not limited to four. For example, as shown in FIG. 13A, only one position determination means 903 may be provided on a camera 900, and only one position determination member 921 may be provided on a mounting component part 920, which can be attached to the camera 900 by rotating around the lens optical axis. In this case, it is possible to distinguish a case that the mounting component part 920 is attached to the camera 900 at a rotation angle of 0° around the lens optical axis (see FIG. 13B) from a case that the mounting component part 920 is attached to the camera 900 at a rotation angle other than 0° around the lens optical axis (see FIG. 13C). That is, it is possible to set two photographing modes. In this way, according to the number of the position determination means, it is possible to set the number of the photographing modes that can be set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023507, filed Feb. 17, 2021, which is hereby incorporated by reference herein in its entirety.

What is claimed is:

1. An image pickup apparatus, to which a mounting component part having a wireless IC tag can be attached, comprising:
at least one processor and/or circuit configured to function as following units;
a reading unit configured to read information recorded in the wireless IC tag;
an attitude determination unit configured to determine an attitude of the mounting component part, which is attached, with respect to the image pickup apparatus; and
a function changing unit configured to change a function of the image pickup apparatus, and
wherein an opening portion is formed so as to face an image pickup lens of the image pickup apparatus when the mounting component part is attached to the image pickup apparatus, and
in a case that the reading unit can read the information recorded in the wireless IC tag, the function changing unit changes the function of the image pickup apparatus according to the attitude of the mounting component part, which is determined.

2. The image pickup apparatus according to claim 1, wherein the function changing unit changes a photographing mode of the image pickup apparatus.

3. The image pickup apparatus according to claim 2, wherein the function changing unit changes the photographing mode of the image pickup apparatus to a selfie mode.

4. The image pickup apparatus according to claim 3, wherein in the selfie mode, setting values of the image pickup apparatus are predetermined by a user.

5. The image pickup apparatus according to claim 1, wherein the function changing unit changes the setting values of the image pickup apparatus.

6. The image pickup apparatus according to claim 1, wherein the mounting component part has a front surface and a back surface,
wherein the attitude determination unit determines whether the front surface or the back surface of the mounting component part faces the outside of the image pickup apparatus, and
wherein the function changing unit changes the function of the image pickup apparatus depending on whether the front surface or the back surface of the mounting component part faces the outside of the image pickup apparatus.

7. The image pickup apparatus according to claim 6, wherein in the mounting component part, a reflectance of the front surface is different from a reflectance of the back surface.

8. The image pickup apparatus according to claim 7, wherein in a case that the surface whose reflectance is high faces the outside of the image pickup apparatus, the function changing unit changes a photographing mode of the image pickup apparatus to a selfie mode.

9. The image pickup apparatus according to claim 1, wherein when the mounting component part is attached to the image pickup apparatus, the mounting component part is mechanically locked to the image pickup apparatus.

10. The image pickup apparatus according to claim 1, wherein the mounting component part can be attached at a plurality of positions around an optical axis of an image pickup lens included in the image pickup apparatus,
wherein the attitude determination unit determines at which position around the optical axis the mounting component part is attached, and
wherein the function changing unit changes the function of the image pickup apparatus according to the position where the mounting component part is attached.

11. The image pickup apparatus according to claim 10, wherein the mounting component part has a display that indicates a function corresponding to the position where the mounting component part is attached.

12. The image pickup apparatus according to claim 1, wherein when the function changing unit detects that the mounting component part has been detached from the image pickup apparatus, the function changing unit returns settings of the image pickup apparatus to initial settings.

13. The image pickup apparatus according to claim 1, wherein the attitude determination unit includes a Hall element, and detects a magnetic field or a magnetic pole of a magnet included in the mounting component part so at to determine the attitude of the mounting component part with respect to the image pickup apparatus.

14. The image pickup apparatus according to claim 1, wherein after detecting that the mounting component part is attached to the image pickup apparatus, the reading unit reads the information recorded in the wireless IC tag.

15. The image pickup apparatus according to claim 1, wherein the function changing unit performs activation of specific information of the mounting component part by using identification information recorded in the wireless IC tag.

16. The image pickup apparatus according to claim 15, wherein the identification information recorded in the wireless IC tag is obtained from a server by an operation of an information processing terminal in a communication system, which includes the server, the information processing terminal, and the image pickup apparatus, and is recorded in the wireless IC tag of the mounting component part from the information processing terminal.

17. The image pickup apparatus according to claim 1, wherein the mounting component part comprises an antenna of the wireless IC tag; and
a fixing member for fixing to the image pickup apparatus; and
wherein the antenna, the fixing member, and the opening portion are disposed on substantially the same plane.

18. A control method for an image pickup apparatus, to which a mounting component part having a wireless IC tag can be attached, the control method comprising:
a reading step of reading information recorded in the wireless IC tag;
an attitude determination step of determining an attitude of the mounting component part, which is attached, with respect to the image pickup apparatus; and
a function changing step of changing a function of the image pickup apparatus, and
wherein an opening portion is formed so as to face an image pickup lens of the image pickup apparatus when the mounting component part is attached to the image pickup apparatus, and
in a case that the information recorded in the wireless IC tag can be read in the reading step, in the function changing step, the function of the image pickup apparatus is changed according to the attitude of the mounting component part, which is determined.

19. The control method for the image pickup apparatus according to claim 18,
wherein the mounting component part has a front surface and a back surface,
wherein in the attitude determination step, whether the front surface or the back surface of the mounting component part faces the outside of the image pickup apparatus is determined, and
wherein in the function changing step, depending on whether the front surface or the back surface of the mounting component part faces the outside of the image pickup apparatus, the function of the image pickup apparatus is changed.

20. The control method for the image pickup apparatus according to claim 18,
wherein the mounting component part can be attached at a plurality of positions around an optical axis of an image pickup lens included in the image pickup apparatus,
wherein in the attitude determination step, at which position around the optical axis the mounting component part is attached is determined, and
wherein in the function changing step, according to the position where the mounting component part is attached, the function of the image pickup apparatus is changed.

* * * * *